US012668129B2

(12) United States Patent
Hatakeyama

(10) Patent No.: US 12,668,129 B2
(45) Date of Patent: Jun. 30, 2026

(54) VEHICLE DISPLAY DEVICE

(71) Applicant: Yazaki Corporation, Tokyo (JP)

(72) Inventor: Masaya Hatakeyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/928,601

(22) Filed: Oct. 28, 2024

(65) Prior Publication Data

US 2025/0050738 A1     Feb. 13, 2025

Related U.S. Application Data

(63) Continuation of application No. PCT/JP2023/036089, filed on Oct. 3, 2023.

(30) Foreign Application Priority Data

Oct. 3, 2022     (JP) ................................. 2022-159457

(51) Int. Cl.
| | |
|---|---|
| *B60K 35/65* | (2024.01) |
| *B60K 35/23* | (2024.01) |
| *B60K 35/81* | (2024.01) |
| *G06T 7/62* | (2017.01) |
| *G06V 20/59* | (2022.01) |
| *G06V 40/16* | (2022.01) |
| *G06V 40/18* | (2022.01) |

(52) U.S. Cl.
CPC ............ *B60K 35/654* (2024.01); *B60K 35/23* (2024.01); *B60K 35/81* (2024.01); *G06T 7/62* (2017.01); *G06V 20/597* (2022.01); *G06V*

*40/178* (2022.01); *G06V 40/18* (2022.01); *B60K 2360/21* (2024.01); *B60K 2360/31* (2024.01); *B60K 2360/349* (2024.01); *G06T 2207/30201* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 5,214,413 | A | * 5/1993 | Okabayashi | ............. G09G 3/02 345/7 |
| 10,997,861 | B2 | 5/2021 | Narumi et al. | |
| 2009/0010488 | A1 * | 1/2009 | Matsuoka | ............. B60W 40/08 382/100 |
| 2016/0173867 | A1 * | 6/2016 | Ichihashi | ............... B60K 35/60 348/54 |

(Continued)

FOREIGN PATENT DOCUMENTS

| | | |
|---|---|---|
| JP | 2018-043724 A | 3/2018 |
| JP | 2019-059245 A | 4/2019 |

*Primary Examiner* — Christopher R Lamb
(74) *Attorney, Agent, or Firm* — Sughrue Mion, PLLC

(57) ABSTRACT

In a vehicle display device, in accordance with a change in a degree of lightness around a vehicle based on illuminance detected by an illuminance sensor that detects illuminance around the vehicle, a brightness adjustment unit makes a response of brightness adjustment of a virtual image to the detected change in illuminance relatively fast when an age of a driver estimated by an age estimation unit is relatively high, and makes a response of the brightness adjustment of the virtual image to the detected change in illuminance relatively slow when the age of the driver is relatively low.

2 Claims, 4 Drawing Sheets

(56)        References Cited

U.S. PATENT DOCUMENTS

| | | | |
|---|---|---|---|
| 2019/0025580 A1* | 1/2019 | Nagano | G02B 27/01 |
| 2019/0162958 A1* | 5/2019 | Kobashigawa | G02B 27/0101 |
| 2019/0259279 A1* | 8/2019 | Narumi | B60R 1/06 |
| 2021/0020141 A1* | 1/2021 | Yuasa | G06F 3/012 |

* cited by examiner

FIG.2

AGE-SPECIFIC COEFFICIENT

| AGE | TWENTIES AND BELOW | THIRTIES | FORTIES | FIFTIES | SIXTIES | SEVENTIES AND ABOVE |
|-----|--------------------|----------|---------|---------|---------|---------------------|
| y | 1.0 | 0.9 | 0.8 | 0.7 | 0.6 | 0.5 |

VEHICLE DISPLAY DEVICE

CROSS-REFERENCE TO RELATED APPLICATION(S)

This application is a continuation application of International Application PCT/JP2023/036089, filed on Oct. 3, 2023 which claims the benefit of priority from Japanese Patent Application No. 2022-159457 filed on Oct. 3, 2022 and designating the U.S., the entire contents of which are incorporated herein by reference.

BACKGROUND OF THE INVENTION

1. Field of the Invention

The present invention relates to a vehicle display device.

2. Description of the Related Art

Some augmented reality head-up display (AR-HUD) devices mounted on vehicles such as automobiles adjust the brightness of a virtual image using an illuminance sensor mounted on the vehicle side. The illuminance sensor detects brightness in an upward direction outside the vehicle, and is mainly used in an automatic light which is a function of a headlight. Thus, the brightness detected by the illuminance sensor may be different from the brightness felt by the driver looking forward.

On the other hand, since there are individual differences in how the driver feels the brightness of a virtual image displayed in front of the driver, for example, there is a one that adjusts the brightness of the virtual image using an illuminance sensor and a pupil diameter of a pupil of the driver (see, for example, Japanese Patent Application Laid-open No. 2018-43724). In addition, there is one for determining a display content and a display position of a virtual image for each driver according to attribute information such as age and gender of the driver (see, for example, Japanese Patent Application Laid-open No. 2019-59245).

SUMMARY OF THE INVENTION

By the way, how the surrounding brightness is felt tends to change with aging (for example, reference "Vision 1 Structure and Initial Function of Visual System", P192, graph showing age-related changes in brightness sensitivity). In addition, for example, when the vehicle passes through a tunnel in the daytime in good weather, if the surroundings of the vehicle change from a bright state to a dark state or from the dark state to the bright state, the virtual image visually recognized by the driver in front of the vehicle may be temporarily difficult to see. In dark adaptation and light adaptation, the adaptation time is generally delayed due to aging, and thus, for example, when the vehicle moves from a bright place to a dark place, the virtual image may be too bright to see the front, and thus there is room for improvement.

An object of the present invention is to provide a vehicle display device capable of accurately adjusting the brightness of a virtual image to be displayed.

Solution to Problem

In order to achieve the above object, a vehicle display device according to one aspect of the present invention includes an image display unit that projects a display image on a projection target member of a vehicle and causes a driver of the vehicle to visually recognize a virtual image corresponding to the display image projected on the projection target member; an illuminance detection unit that detects illuminance around the vehicle; an age acquisition unit that acquires an age of the driver; and an adjustment unit that adjusts brightness of the virtual image on a basis of the illuminance detected by the illuminance detection unit and the age acquired by the age acquisition unit, wherein in accordance with a change in a degree of lightness around the vehicle based on the illuminance detected by the illuminance detection unit, and the adjustment unit makes a response of brightness adjustment of the virtual image to the change in the detected illuminance relatively fast when the age of the driver acquired by the age acquisition unit is relatively high, and makes a response of the brightness adjustment of the virtual image to the change in the detected illuminance relatively slow when the age of the driver is relatively low.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram illustrating a schematic configuration of a vehicle display device according to the embodiment;

DETAILED DESCRIPTION OF THE PREFERRED EMBODIMENTS

Hereinafter, an embodiment of a vehicle display device according to the present invention will be described in detail with reference to the drawings. Note that the present invention is not limited by the following embodiments. That is, constituent elements in the following embodiments include those that can be easily assumed by those skilled in the art or those that are substantially the same, and various omissions, substitutions, and changes can be made without departing from the gist of the invention.

Embodiment

Figure 1:
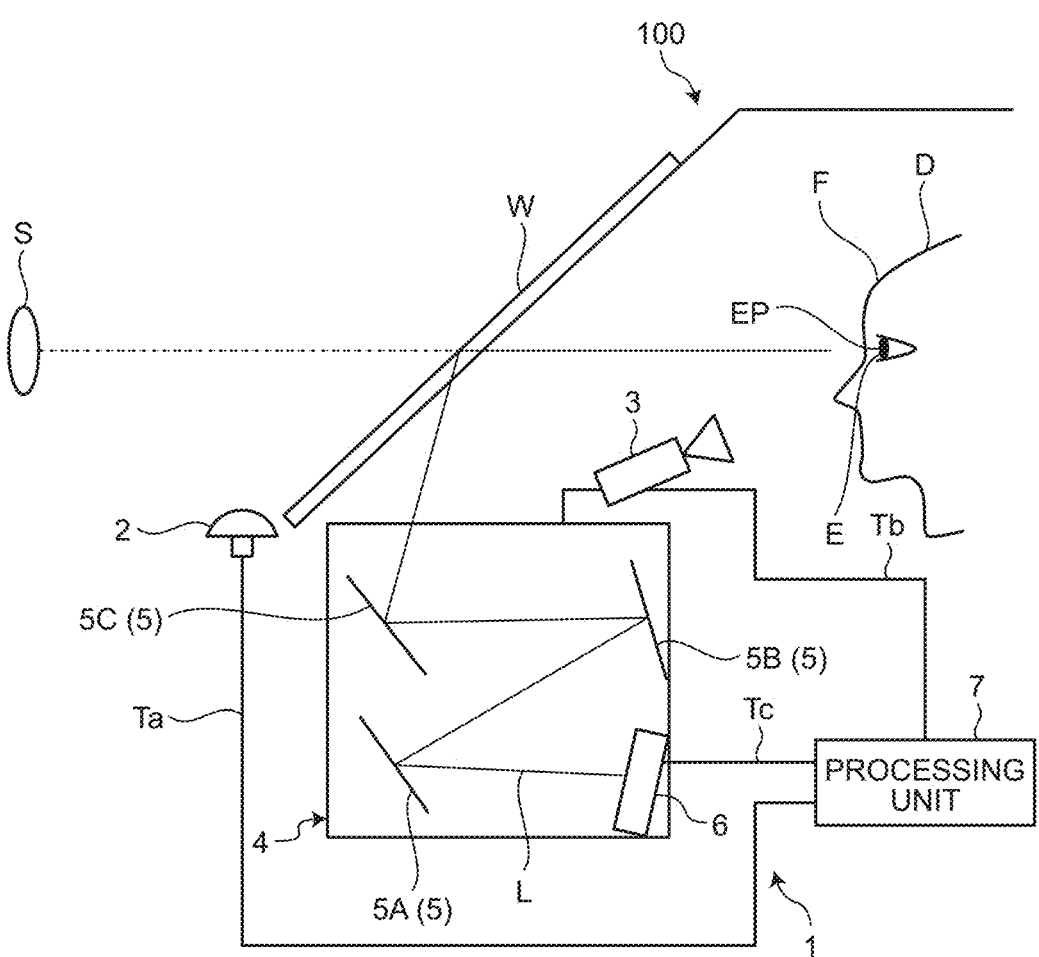
FIG. 1 is a schematic diagram illustrating a schematic configuration of a vehicle display device according to an embodiment.

As illustrated in FIG. 1, the vehicle display device 1 according to the present embodiment is, for example, a head up display (HUD) mounted on a vehicle 100 such as an automobile. The vehicle display device 1 causes a driver D of the vehicle 100 to visually recognize a display image displayed on a display device 6 as a virtual image S by projecting the display image on a windshield W that is a projection target member via a reflection mirror 5. The display image includes, for example, numbers, characters, symbols, figures, icons, and the like indicating information regarding the vehicle 100, information outside the vehicle, and the like. For example, the vehicle display device 1 can display the virtual image S so as to be superimposed on a vehicle, a pedestrian, a traffic signal, a sign, a lane, or the like in the real landscape in front of the driver D. The vehicle display device 1 is disposed, for example, inside an instrument panel (not illustrated) in the vehicle interior.

Since the windshield W has a semi-transmissive property of reflecting a part of incident light and transmitting the other part, the windshield W reflects the display image projected from the vehicle display device 1 as display light L toward an eye point EP of the driver D while transmitting the foreground of the vehicle. The eye point EP is assumed in advance as a viewpoint position of the driver D. The driver D recognizes the display image reflected by the windshield W as the virtual image S. The virtual image S is recognized in front of the windshield W by the driver D.

The vehicle display device 1 includes an illuminance sensor 2, a driver camera 3, a housing 4, three reflection mirrors 5A to 5C, a display device 6, and a processing unit 7.

The illuminance sensor 2 is an example of an illuminance detection unit, and detects illuminance of the vehicle 100. The illuminance sensor 2 is attached to, for example, an instrument panel or a back side of a room mirror (not illustrated) in the vehicle interior, and detects illuminance in front of the vehicle, for example, around the vehicle 100. The illuminance sensor 2 is activated when an accessory (ACC) power supply or an ignition (IG) power supply of the vehicle 100 is turned on, and continues to detect the illuminance until these power supplies are turned off. The illuminance sensor 2 is connected to the processing unit 7 by, for example, a signal line Ta. The illuminance sensor 2 outputs the illuminance detected by the illuminance sensor 2 as illuminance information to the processing unit 7 via the signal line Ta.

The driver camera 3 is an example of an imaging unit, and a camera lens (not illustrated) is arranged toward the driver D and continuously acquires a face image including the face F of the driver D. The driver camera 3 is disposed, for example, above a steering column (not illustrated) in the vehicle interior and behind a steering wheel (not illustrated) as viewed from the driver D. For example, the driver camera 3 can capture an image of the face F of the driver D and acquire a still image (frame) obtained from the captured moving image as a face image. As the image capturing environment of the driver camera 3, for example, the sensor size is set to "VGA (640×480)" and the frame rate is set to "30 [fps]". The driver camera 3 is connected to the processing unit 7 via a signal line Tb. The driver camera 3 outputs the acquired face image to the processing unit 7 via the signal line Tb.

The driver camera 3 includes, for example, a light source which is not illustrated. The light source is, for example, a light emitting diode (LED) that emits near-infrared light toward driver D. The light source is turned on (emits infrared light) according to a turn-on signal input from a control unit which is not illustrated, and is turned off according to a turn-off signal. The driver camera 3 receives reflected light by light emitted to the face F of the driver D by a light source to capture the face of the driver D. The driver camera 3 is activated when the ACC power supply or the like of the vehicle 100 is turned on, and continues to capture the face of the driver D until the power supply or the like is turned off.

The housing 4 is formed of, for example, synthetic resin or the like, and is fixed to a vehicle body (not illustrated). As illustrated in FIG. 1, the housing 4 accommodates and supports the reflection mirrors 5A to 5C and the display device 6.

The reflection mirrors 5A to 5C are disposed on an optical path of the display light L from the display device 6 to the windshield W, and reflect the display light L emitted from the display device 6 toward the windshield W. The reflection mirrors 5A to 5C are constituted by flat mirrors, concave mirrors, or the like, for example.

The display device 6 is an example of an image display unit, and emits, as the display light L, a display image to be visually recognized as the virtual image S by the driver D of the vehicle 100. That is, the vehicle display device 1 projects the display image displayed by display device 6 onto the windshield W using the reflection mirrors 5A to 5C, and causes driver D to visually recognize the virtual image S corresponding to the display image projected onto the windshield W. The display device 6 is, for example, a light transmissive display that transmits light from the back side to the front side. As the light transmissive display, for example, a thin film transistor (TFT) liquid crystal display is used. The display device 6 is activated when the ACC power supply or the like of the vehicle 100 is turned on, and continues to be driven until the power supply or the like is turned off.

Figure 2:
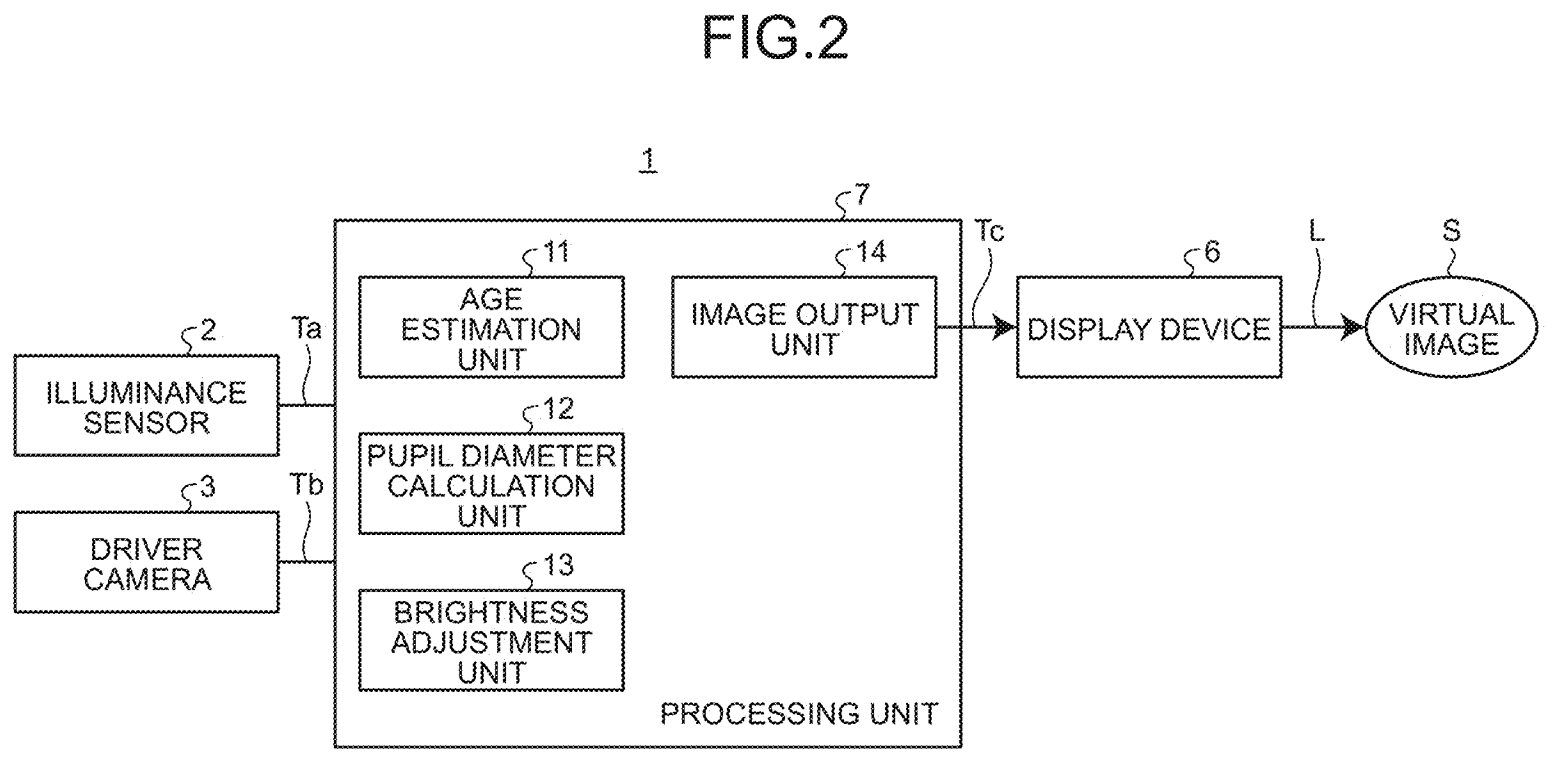

The processing unit 7 executes various processes in the vehicle display device 1. The processing unit 7 includes, for example, various computers. As illustrated in FIG. 2, the processing unit 7 of the present embodiment functionally and conceptually includes an age estimation unit 11, a pupil diameter calculation unit 12, a brightness adjustment unit 13, and an image output unit 14. The age estimation unit 11, the pupil diameter calculation unit 12, the brightness adjustment unit 13, and the image output unit 14 exhibit various functions, for example, when a computer (for example, a microcomputer) constituting the processing unit 7 executes a program. The various functions include known image processing, pupil E detection processing, and the like. The processing unit 7 is connected to the display device 6 via a signal line Tc. The processing unit 7 outputs the display image displayed by the display device 6 to the display device 6 via the signal line Tc.

The age estimation unit 11 estimates the age of the driver D on the basis of the face image captured by the driver camera 3. The age estimation unit 11 estimates the age of the driver D by analyzing the face image using known image processing, for example. The age estimation unit 11 stores the estimated age as age information in a memory provided in the processing unit 7, or updates the age information stored in the memory to new age information.

The pupil diameter calculation unit 12 detects the pupil E of the driver D on the basis of the face image captured by the driver camera 3 and calculates the pupil diameter PD of the pupil E. For example, the pupil diameter calculation unit 12 roughly searches for the pupil E of the driver D from the face image of one frame using known image processing, and detects the pupil E on the basis of the result. The known image processing includes, for example, a Viola-Jones method, a model-based method using an eyeball 3D model, a template matching method, a particle method, and the like. In addition, the pupil diameter calculation unit 12 calculates the pupil diameter PD of the pupil E on the basis of the detected pupil E. The pupil diameter calculation unit 12 sequentially calculates the pupil diameter PD from a plurality of consecutive frames acquired by the driver camera 3, and stores the calculated pupil diameter PD as pupil diameter information in association with each frame in the memory in the processing unit 7. The pupil diameter PD of the driver D changes between approximately 2 to 8 mm in accordance with a change in brightness around the vehicle (for example, reference literature "Vision 1 Structure and Initial Function of Visual System", P19, Graph illustrating Relationship between Luminance and Pupil Diameter). In the present embodiment, a change in brightness felt by the driver D is detected on the basis of a change in the pupil diameter PD of the driver D.

The brightness adjustment unit 13 adjusts the brightness of the virtual image S on the basis of the illuminance detected by the illuminance sensor 2, the age estimated by the age estimation unit 11, and the pupil diameter PD calculated by the pupil diameter calculation unit 12. Specifically, when an average value of the pupil diameters PD corresponding to the number of frames for age adjustment calculation Z is set to "Φave" [mm], a minimum value of the pupil diameter PD assumed in advance is set to "Φmin" [mm], a maximum value of the pupil diameter PD assumed in advance is set to "Φmax" [mm], and a value of the illuminance detected by the illuminance sensor 2 expressed as a percentage with respect to the maximum value of the illuminance detectable by the illuminance sensor 2 is set to "Q" [%] in a case where an age-specific coefficient that is set in advance according to age and that becomes relatively smaller as the age becomes higher and becomes relatively larger as the age becomes lower is set to "y", the reference frame number is set to "X", and the number of frames for age adjustment calculation obtained by multiplying the reference frame number X by the age-specific coefficient y is set to "Z", the brightness adjustment unit 13 adjusts the brightness of the virtual image on the basis of an adjustment value V [%] calculated by the following Expression (1).

$$V = \frac{[(\phi ave - \phi min) \times \{100 / (\phi max - \phi min)\}] + Q}{2} \quad (1)$$

Figures 3, 4:
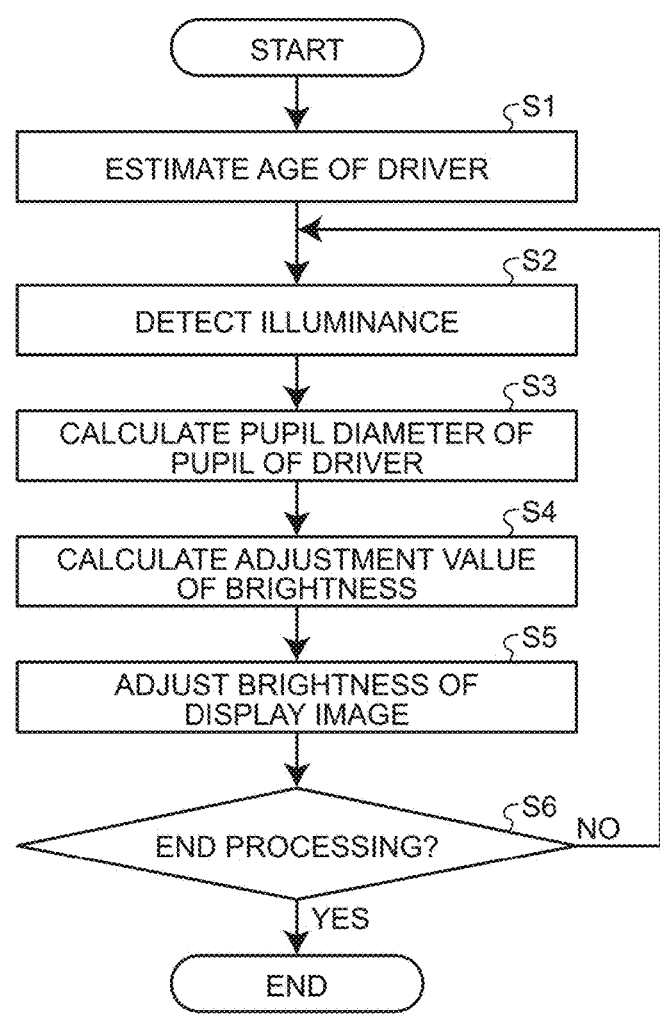
FIG. 3 is a flowchart illustrating a flow of brightness adjustment of a virtual image in the vehicle display device according to the embodiment.
FIG. 4 is a diagram illustrating an example of an age-specific coefficient table according to the embodiment.
Figure 5:
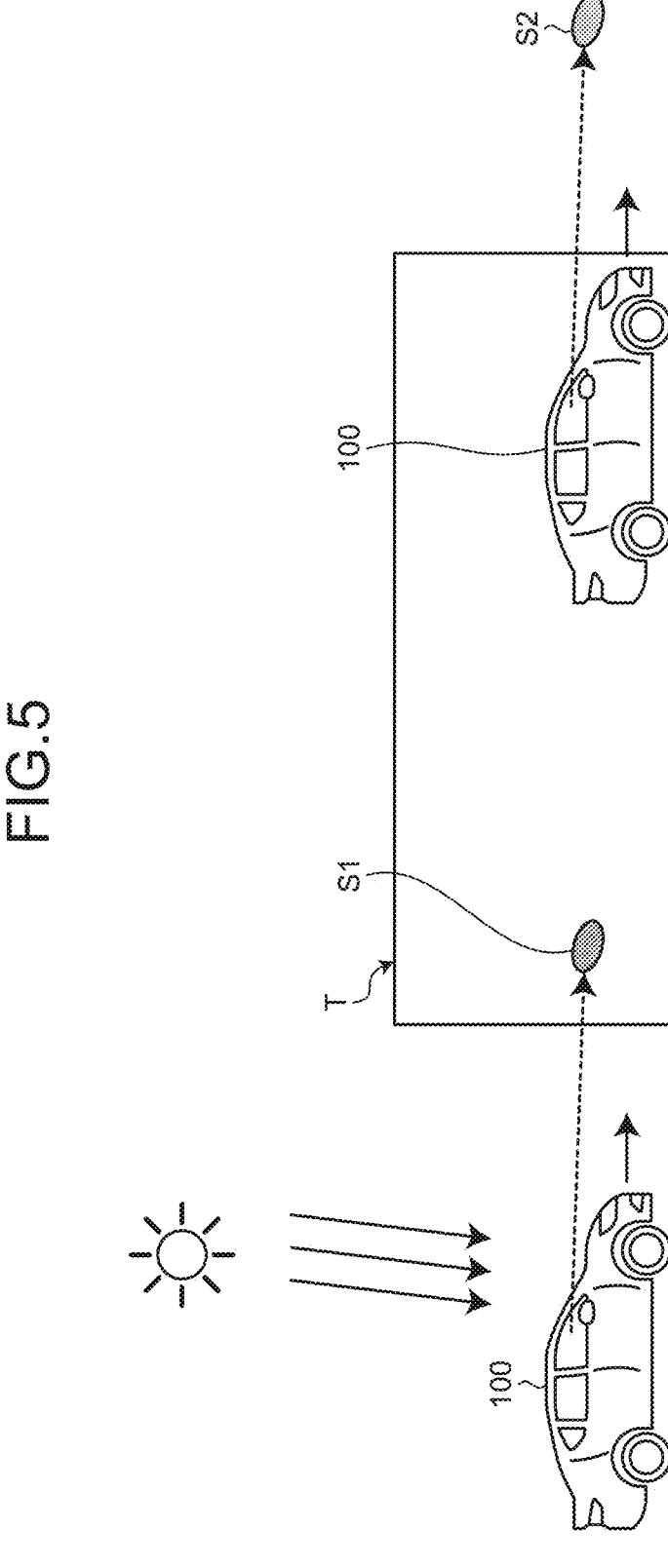
FIG. 5 is a schematic diagram illustrating an example of a brightness change of a virtual image when the vehicle passes through a tunnel.

For example, as illustrated in FIG. 4, the age-specific coefficient y is "1.0" for "people in their twenties" (29 years old or younger), "0.9" for "people in their thirties" (30 to 39 years old), "0.8" for "people in their forties" (40 to 49 years old), "0.7" for "people in their fifties" (50 to 59 years old), "0.6" for "people in their sixties" (60 to 69 years old), and "0.5" for "people in their seventies" (70 years old or older). Since the dark adaptation time of vision of the driver D is delayed due to aging (for example, reference literature "International Society for Traffic Safety: Research and investigation on human accident factors of elderly drivers", https://www.iatss.or.jp/common/pdf/research/h494.pdf, P12, FIGS. 2.2-2, graphs showing aging and dark adaptation process), for example, when the vehicle 100 moves from a bright place to a dark place as illustrated in FIG. 5, there is a possibility that the display of the virtual image S visually recognized by the driver D is too bright and it becomes difficult to see the front. The bright place illustrated in FIG. 5 is, for example, outside a tunnel T in the daytime when the weather is good, and the dark place is inside the tunnel T. Accordingly, in the present embodiment, in order to cope with the change in dark adaptation due to aging, the age-specific coefficient y having a different value for each age is set. The age-specific coefficient y is a coefficient set in advance according to age and is a coefficient that becomes relatively smaller as the age becomes higher and becomes relatively larger as the age becomes lower. For example, y=1.0 when the driver D is 20 years old, and y=0.5 when the driver D is 70 years old. Since the change in the adaptation time due to aging is similarly delayed not only for dark adaptation but also for light adaptation, the illustrated age-specific coefficient y is used.

The reference frame number X is the degree of smoothness set in any manner by a system designer to smooth the pupil diameter PD with time. The reference frame number X takes a value of about 2 to several tens.

The age adjustment calculation frame number Z is obtained by multiplying the reference frame number X by the age-specific coefficient y. For example, in the case of reference frame number X=10, Z=10 when driver D is 20 years old, and Z=5 when driver D is 70 years old.

The average value Φave [mm] of the pupil diameters PD corresponding to the number of frames for age adjustment calculation Z is, for example, $PD_1 + PD_2 + \ldots + PDz/Z$, where a plurality of pupil diameters PD for the number of frames for age adjustment calculation Z is "$PD_1, PD_2, \ldots, PDz$" (Z=1, 2, ..., Z).

The minimum value Φmin [mm] of the pupil diameter PD assumed in advance is a minimum value of the pupil diameter PD of the driver D that changes between 2 to 8 mm in accordance with the change in brightness around the vehicle described above, and is, for example, 2 mm.

The maximum value Φmax [mm] of the pupil diameter PD assumed in advance is a maximum value of the pupil diameter PD of the driver D that changes between 2 to 8 mm in accordance with the change in brightness around the vehicle described above, and is, for example, 8 mm.

The adjustment value V of the brightness of the virtual image S is obtained by averaging P and Q obtained by expressing the illuminance detected by the illuminance sensor 2 in percentage with respect to the maximum value of the illuminance detectable by the illuminance sensor 2, where P is a value obtained by expressing the average value Φave of the pupil diameters PD corresponding to the above-described number of frames for age adjustment calculation z in percentage with respect to the minimum value (Φmin) and the maximum value (Φmax) of the pupil diameters PD assumed in advance. The adjustment value V of the brightness of the virtual image S changes a response of brightness adjustment of the virtual image S in accordance with the change in the degree of lightness around the vehicle based on the illuminance detected by the illuminance sensor 2. For example, when the age of the driver D is relatively high, the brightness adjustment value V of the virtual image S becomes such a value that a response of the brightness adjustment of the virtual image S to the detected change in illuminance becomes relatively fast. On the other hand, when the age of the driver D is relatively low, the brightness adjustment value V of the virtual image S becomes such a value that a response of the brightness adjustment of the virtual image S to the detected change in illuminance becomes relatively slow.

For example, the image output unit 14 controls driving of the TFT liquid crystal display of the display device 6, and causes the display device 6 to output a display image to be visually recognized by the driver D as the virtual image S. The image output unit 14 causes the display device 6 to output the display image adjusted by the brightness adjustment unit 13 on the basis of the adjustment value V of the brightness of the virtual image S.

Next, a flow of brightness adjustment control of the virtual image S in the vehicle display device 1 will be described with reference to a flowchart illustrated in FIG. 3. The vehicle display device 1 is activated when the ACC power supply or the like of the vehicle 100 is turned on, and repeats the processing described below until the power supply or the like is turned off.

In Step S1, the age estimation unit 11 estimates the age of the driver D on the basis of the face image captured by the driver camera 3, and stores the estimated age in the memory as age information.

Next, in Step S2, the brightness adjustment unit 13 stores the illuminance detected by the illuminance sensor 2 in the memory as illuminance information.

Next, in Step S3, the pupil diameter calculation unit 12 detects the pupil E of the driver D on the basis of the face image captured by the driver camera 3 and calculates the pupil diameter PD of the pupil E. The pupil diameter calculation unit 12 stores the calculated pupil diameter PD in a memory as pupil diameter information.

Next, in Step S4, the brightness adjustment unit 13 reads out the age information, the illuminance information, and the pupil diameter information from the memory, substitutes them into the above-described Expression (1) to calculate the adjustment value V, and stores the calculated adjustment value V in the memory.

Next, in Step S5, the brightness adjustment unit 13 reads the adjustment value V stored in the memory in Step S4, and adjusts the brightness of the virtual image S on the basis of the adjustment value V. The image output unit 14 outputs the display image adjusted by the brightness adjustment unit 13.

In Step S6, the brightness adjustment unit 13 determines whether or not to end the present processing. When this processing is not ended, the process returns to Step S2. For example, in Step S6, when the ACC power supply or the like of the vehicle 100 is turned off, the processing unit 7 ends the present processing according to an OFF signal input from the vehicle 100 side.

With the above processing, based on the age estimated by the age estimation unit 11 and the pupil diameter calculated by the pupil diameter calculation unit 12, the brightness adjustment unit 13 calculates the adjustment value V in accordance with the change in the degree of lightness around the vehicle based on the illuminance detected by the illuminance sensor 2, and adjusts the brightness of the virtual image S using the adjustment value V. Thus, when the surroundings of the vehicle change from the bright state to the dark state, the vehicle display device 1 can darken the brightness of virtual image S relatively faster when the driver D is relatively higher as compared with the driver D whose age is relatively low. On the other hand, in a case where the surroundings of the vehicle change from the dark state to the bright state, when the age of driver D is relatively high, the vehicle display device 1 can make the brightness of virtual image S relatively faster as compared with the driver D whose age is relatively low.

As described above, in the vehicle display device 1 according to the present embodiment, in accordance with a change in the degree of lightness around the vehicle based on the illuminance detected by the illuminance sensor 2, the brightness adjustment unit 13 makes the response of the brightness adjustment of the virtual image S to the detected change in illuminance relatively fast when the age of the driver D estimated by the age estimation unit 11 is relatively high, and makes the response of the brightness adjustment of the virtual image S to the detected change in illuminance relatively slow when the age of the driver D is relatively low.

In the conventional brightness adjustment of the virtual image S, for example, when the vehicle 100 passes through the tunnel T (see FIG. 5) in the daytime when the weather is good, when the surroundings of the vehicle change from the bright state to the dark state, the brightness of virtual image S1 is made relatively dark, and when the surroundings of the vehicle change from the bright state to the dark state, the brightness of virtual image S2 is made relatively dark.

In the vehicle display device 1 with the above configuration, for example, in a case where the surroundings of the vehicle change from the bright state to the dark state when the vehicle 100 passes through the tunnel T (see FIG. 5) in the daytime when the weather is good, when the age of the driver D is relatively high, the brightness of the virtual image S becomes dark relatively faster as compared with the driver D whose age is relatively low, and it is possible to reduce that the virtual image S superimposed and projected on the real landscape becomes too bright and the front is difficult to see. On the other hand, in the vehicle display device 1, in a case where the surroundings of the vehicle change from the dark state to the bright state, when the age of the driver D is relatively high, the brightness of the virtual image S becomes bright relatively faster as compared with the driver D whose age is relatively low, and it is possible to reduce that the virtual image S superimposed and projected on the real landscape becomes too dark and difficult to see. As a result, the merchantability of the vehicle display device 1 can be improved.

Further, in the vehicle display device 1 according to the present embodiment, the brightness adjustment unit 13 adjusts the brightness of the virtual image S on the basis of the adjustment value V [%] calculated by the above formula (1). Thus, as described above, for example, when the driver D drives the vehicle 100 and passes through the tunnel T, the vehicle display device 1 can improve the merchantability of the device by reducing a situation in which the virtual image S becomes relatively too bright and the front is difficult to see and a situation in which the virtual image S becomes too dark and difficult to see.

In addition, in the vehicle display device 1 according to the present embodiment, the age estimation unit 11 estimates the age of the driver D on the basis of the face image captured by the driver camera 3. Thus, for example, it is possible to save work for the driver D to input his/her age by operating the device, and it is possible to improve convenience of the driver D. In addition, by suppressing erroneous input of the age of the driver D, the function of the device can be effectively exhibited.

In the above embodiment, the age estimation unit 11 estimates the age of the driver D on the basis of the face image captured by the driver camera 3, but the present invention is not limited thereto. For example, the age estimation unit 11 may be configured to cause the driver D to directly input the age.

Further, in the above embodiment, as described above, the vehicle display device 1 is activated when the ACC power supply or the like of the vehicle 100 is turned on, and the processing illustrated in FIG. 3 is repeated until the power supply or the like is turned off.

Further, in the above embodiment, the illuminance sensor 2 is provided exclusively for the vehicle display device 1, but the present invention is not limited thereto, and the illuminance sensor 2 provided for automatic lighting of the headlight of the vehicle 100 may be used.

Further, in the above embodiment, the driver camera 3 is installed in the steering column, but the present invention is not limited thereto, and the driver camera 3 may be installed in an instrument panel, a dashboard, a room mirror, or the like.

Further, in the above embodiment, the housing 4 accommodates the three reflection mirrors 5A to 5C, but the number of reflection mirrors 5A to 5C is not limited thereto.

Further, in the above embodiment, the vehicle display device 1 is applied to the vehicle 100 such as an automobile, but is not limited thereto, and may be applied to, for example, a ship, an aircraft, or the like other than the vehicle.

According to a vehicle display device of the present embodiment, it is possible to accurately adjust brightness of a virtual image to be displayed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
an image display unit that projects a display image on a projection target member of a vehicle and causes a driver of the vehicle to visually recognize a virtual image corresponding to the display image projected on the projection target member;
an illuminance detection unit that detects illuminance around the vehicle;
an age acquisition unit that acquires an age of the driver;
an adjustment unit that adjusts brightness of the virtual image on a basis of the illuminance detected by the illuminance detection unit and the age acquired by the age acquisition unit,
an imaging unit that captures an image of a face of the driver; and
a pupil diameter calculation unit that detects a pupil of the driver on a basis of the image captured by the imaging unit and calculates a pupil diameter of the detected pupil, wherein
in accordance with a change in a degree of lightness around the vehicle based on the illuminance detected by the illuminance detection unit, and
the adjustment unit
makes a response of brightness adjustment of the virtual image to the change in the detected illuminance relatively fast when the age of the driver acquired by the age acquisition unit is relatively high, and
makes a response of the brightness adjustment of the virtual image to the change in the detected illuminance relatively slow when the age of the driver is relatively low,
in a case where an age-specific coefficient that is set in advance according to age and that becomes relatively smaller as the age becomes higher and becomes relatively larger as the age becomes lower is set to "y", a reference frame number is set to "X", and a number of frames for age adjustment calculation obtained by multiplying the reference frame number X by the age-specific coefficient y is set to "Z", when an average value of the pupil diameters corresponding to the number of frames for age adjustment calculation Z is set to "Φave" [mm], a minimum value of the pupil diameters assumed in advance is set to "Φmin" [mm], a maximum value of the pupil diameters assumed in advance is set to "Φmax" [mm], and a value of the illuminance detected by the illuminance detection unit expressed as a percentage with respect to a maximum value of the illuminance detectable by the illuminance detection unit is set to "Q" [%],
the adjustment unit
adjusts the brightness of the virtual image on a basis of an adjustment value V [%] calculated by Expression (1) below:

$$V = \frac{[(\phi ave - \phi min) \times \{100 / (\phi max - \phi min)\}] + Q}{2}. \tag{1}$$

2. The vehicle display device according to claim 1, wherein
the age acquisition unit includes
estimating the age of the driver on a basis of at least the image captured by the imaging unit.

* * * * *